April 18, 1961 L. J. DENNIS 2,979,809
METHOD OF MAKING HOLLOW TURBINE BLADES
Filed March 11, 1957 2 Sheets-Sheet 1

INVENTOR
LEONARD J. DENNIS
BY
Watson, Cole, Grindle & Watson
ATTORNEYS

April 18, 1961 L. J. DENNIS 2,979,809
METHOD OF MAKING HOLLOW TURBINE BLADES
Filed March 11, 1957 2 Sheets-Sheet 2

INVENTOR
LEONARD J. DENNIS

BY
Watson, Cole, Grindle & Watson
ATTORNEYS

United States Patent Office 2,979,809
Patented Apr. 18, 1961

2,979,809

METHOD OF MAKING HOLLOW TURBINE BLADES

Leonard James Dennis, Carpenders Park, England, assignor to D. Napier & Son Limited, London, England, a company of Great Britain Filed Mar. 11, 1957, Ser. No. 645,273

Claims priority, application Great Britain Mar. 14, 1956

7 Claims. (Cl. 29—156.8)

This invention relates to a method of making hollow blades for turbines and the like, which expression is intended to include both turbines and rotary compressors, the blades being either rotor blades or stator blades. However, as the invention can be used to the best advantage in blades for turbine rotors the invention will be described more particularly in relation to such blades.

Hollow blades for turbines are known to have several advantages over solid blades. In the first place, it is possible to cool them by circulating a cooling medium through the hollow interior of each blade in order to extend the working range of available materials and so permit higher gas temperatures to be used. Secondly, a hollow blade is generally lighter than a solid blade of similar cross-section, thereby reducing the centrifugal loading on the rotor.

It is also desirable in certain turbines for the blades to comprise three different zones each fulfilling a different function. These zones are termed herein the aerofoil zone, the platform zone and the root zone. The aerofoil zone is the part of the blade that is of aerofoil shape. The root zone is the part of the blade that fits into the rotor disc or drum. The platform zone constitutes an intermediate zone between the aerofoil zone and the root zone and serves the purpose of preventing the working medium from coming into contact with the root zone and the rotor disc or drum, while in a cooled blade it may contain a passage through which the cooling medium passes on its way to the aerofoil zone. An advantage of a cooled platform zone between the aerofoil zone and the rotor disc or drum is that it restricts heat flow from the aerofoil zone into the rotor disc or drum whereby the disc or drum will operate at a relatively low temperature and so can be of lighter construction than would otherwise be necessary.

According to the present invention a hollow turbine blade has an aerofoil zone, a platform zone and a root zone all formed wholly or partly from a single piece of metal sheet or tube.

In one form of the present invention the blade is made from a blank of sheet metal which is first pressed so that part of it is corrugated with a ridge and a depression destined to form the blade flanks in the aerofoil zone and the remainder, destined to form the platform and root zones, is in the form of a trough with a flap extending from one edge thereof which edge is aligned with the transition line between the said ridge and depression, next the pressing is folded along the said edge and a transition line to close the flap over the trough to make a box-like portion for the platform and root zones and to bring the ridge into the depression to make the aerofoil zone, the adjacent edges of the flap and of the trough constituting one corner of the platform zone are then joined as by welding or brazing, and then the blank is subjected to one or more further manipulations whereby the extremity of the box-like portion is shaped to constitute the root zone.

When the blade is made from tube the platform zone needs no joint and the aerofoil zone is trimmed at the trailing edge as required.

The aerofoil zone may have any of the features of hollow blades made from sheet metal, for instance it may be substantially identical in form with the aerofoil zone of any of the blades described in the present applicants' United States of America appln. 378,935 and U.S. appln. No. 615,271.

The platform zone will generally be in the form of a parallelogram in cross-section, the longer sides contacting adjacent longer sides of neighbouring blades when the blades are assembled on the rotor, the angle of inclination of these longer sides to the main axis of the turbine corresponding to the angle of inclination of the chord of the aerofoil. Preferably a bulge is pressed out of each side of each platform zone so that when the blades are assembled on the rotor disc or drum the bulges on the adjacent sides of the adjacent blades press together, thereby providing an amplitude limiting device to prevent blade vibration raising unduly high stresses in the root zones and in the rotor disc or drum.

The root zone may have any desired form, depending on the particular design, for instance it may have a conventional "fir-tree" form or a "half-bulb" form.

If in the finished blade there are to be substantial variations in wall thickness other than those obtainable by simple tapering of the sheet certain of the manipulations (e.g. certain pressing operations) must be carried out under pressure and temperature conditions conducive to considerable plastic flow of the metal.

Although the blade is made predominantly from a single piece of material it is permissible to incorporate additional parts for certain purposes. For instance, the blade may include a baffle which extends transversely across the interior of the blade in the platform zone and part way up through the hollow interior of the aerofoil zone, for the purpose of directing a flow of cooling medium from an inlet in the root zone through the platform zone, along the interior of the leading edge of the aerofoil zone, over the top of the baffle and out, for instance through apertures formed along the trailing edge of the aerofoil zone. Similarly, there may be an insertion in the root zone to provide additional strength and increase the thickness of the root zone. This insertion may also provide a closure for one end of the root zone to prevent escape of cooling medium admitted at the other end of the root zone. It may also act as a transverse partition between the root zone and the platform zone, for instance to lead cooling medium from an inlet at the rear of the root zone to a point in front of the aforementioned baffle. External projections for sealing or other purposes may be welded to the outside of the platform zone or the root zone as required.

The invention may be carried into practice in various ways and one particular form of blade embodying the invention, and some modifications, will now be described by way of example with reference to the accompanying drawings, in which.

Figure 1:
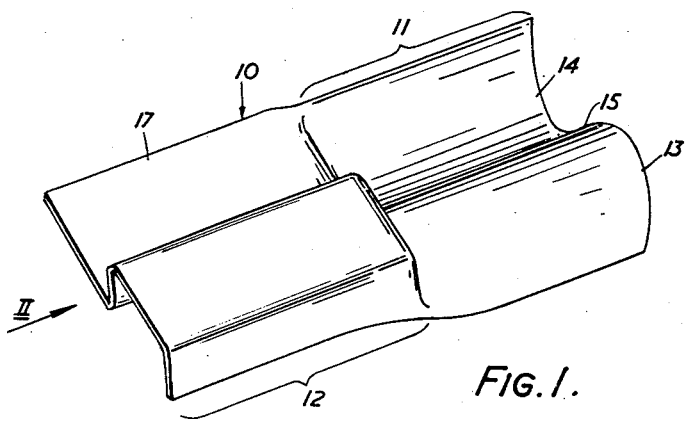
Figure 1 is a perspective view of a partially formed sheet metal blank.
Figure 2:
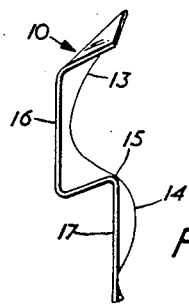
Figure 2 is an end view of the blank shown in Figure 1 looking in the direction of the arrow II.

The blade shown in the drawings is made largely from a blank 10 of sheet metal. First the sheet metal may be rolled so that it tapers in thickness, or rolled or pressed in some other way so as to provide the major changes of wall thickness in the finished blade. The sheet metal is then cut to form a blank 10 of the required shape, in this case approximately a rectangle. Next, the cut sheet is subject to a pressing operation, or a series of such operations, to bring it into the form shown in Figures 1 and 2. A portion 11 extending over approximately half the length of the blank is corrugated to form the basis for the aerofoil zone of the blade and the remaining portion 12 is shaped to form the basis for the platform zone and the root zone. In the portion 11 destined to form the aerofoil zone, the corrugations comprise a convex ridge 13 and a concave depression 14 running parallel along the length of the blank 10. The ridge 13 will constitute the convex flank of the aerofoil zone and the depression 14 will constitute the concave flank. The transition line 15 between the ridge and the depression is the line along which the blank will later be folded, as shown in Figure 3, this part of the fold eventually constituting the leading edge of the aerofoil zone.

In the portion 12 which is to form the platform and root zones the area which is in line with the ridge 13 is pressed out deeply to form a trough 16. The remaining area of the blank is left as a flat flap 17.

Figure 3:
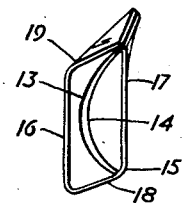
Figure 3 is an end view of the blank after the folding operation.

Next, the pressed blank is folded along the transition line 15 so that the depression 14 is folded back into the concavity of the ridge 13 and the flap 17 is folded back across the mouth of the trough 16 to provide a box-like formation of parallelogram cross-section, as shown in Figure 3.

The adjacent free edges of the flap 17 and the trough 16 are then joined together as by brazing or welding.

Figure 4:
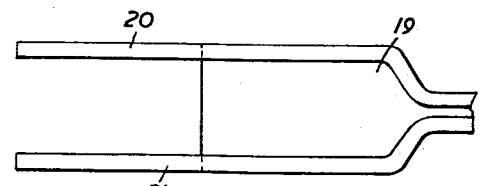
Figures 4, 5 and 6 are diagrammatic side views of the root portion and platform portion at different stages in the manufacture of the root.
Figure 5:
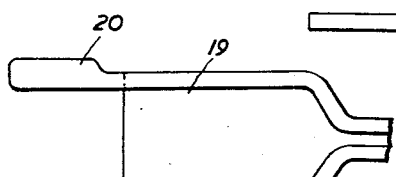
Figure 7:
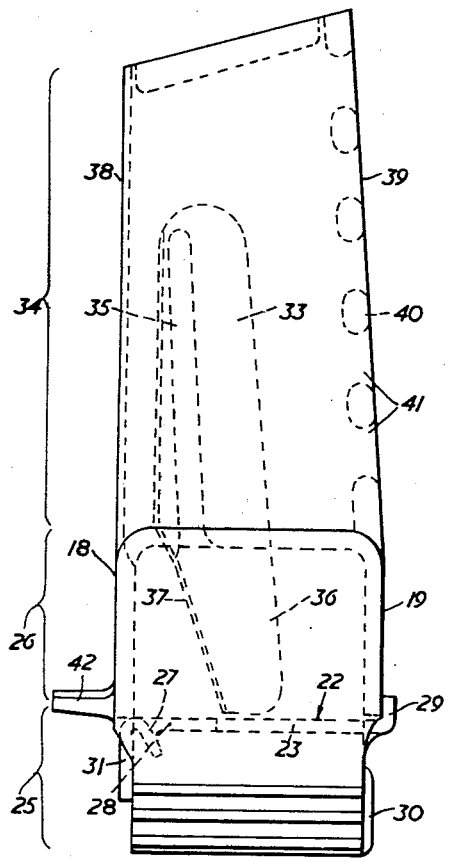
Figure 7 is a side view of the finished blade.
Figure 8:
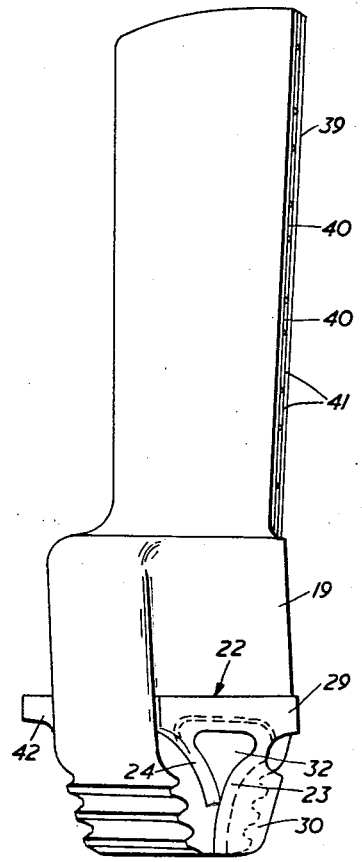
Figure 8 is a perspective view of the finished blade showing the trailing edge and the convex flank of the aerofoil zone.

About half the length of each of the shorter sides 18 and 19 of the box-like formation is then cut away so that this part of the folded blank will have two projecting tongues 20 and 21 as shown in Figure 4. If the root form required is of the "fir tree" type, as shown in Figures 7 and 8, the projecting tongues 20 and 21 are next subjected to an electrical upsetting operation which both shortens and thickens them as shown in Figure 5. They are next subjected to a preliminary corrugating operation, which is a transverse rolling operation, to give the tongues 20 and 21 the rudimentary form of parallel transverse ridges characteristic of a "fir tree" blade root as shown in Figure 6.

Figure 6:
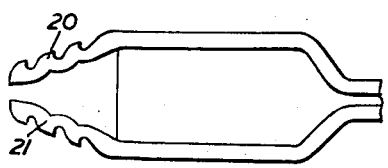

At some convenient time during or after the folding operation, but before the tongues 20 and 21 are bent inwards as shown in Figure 6, a baffle 33 is inserted into the blade. This will be described in more detail below.

The tongues 20 and 21 are then subjected to a pressing operation which squeezes them together. This pressing operation causes some plastic deformation of the metal and brings the "fir tree" root substantially to its final form.

An insertion piece 22 (Figures 7 and 8) is next inserted between the two tongues 20 and 21. This insertion piece is bent from sheet material approximately into the form of an inverted U with one limb 23 longer than the other limb 24. The length of the insertion is longer than the front to rear dimension of the root zone, as is apparent from Figure 7, so that its ends project beyond the ends of the root zone. The bend of the U constitutes a transverse partition between the interiors of the root zone 25 and the platform zone 26, and near the front of the blade a tongue 27 is cut out of the bend of the U and bent downwardly to provide an aperture 28 in the bend. A projecting tab 29 at the rear of the insertion is bent up against the lower part of the rear wall 19 of the platform zone to provide a sealing member and another projecting tab 30 is bent sideways to project beyond the limits of the "fir tree" formation of the root portion to provide endwise location for the blade in its groove. At the front of the blade a projecting tab 31 of the insertion is bent downwardly to close the front of the root zone 25. An opening 32 is left at the rear of the root zone through which a cooling medium can be introduced into the blade.

As previously indicated, a baffle 33 (Figure 7) is inserted into the blade. This baffle extends through the platform zone 26 and along part of the length of the aerofoil zone 34. This baffle may be made as a pressing from a single piece of sheet metal, being in the form of two elongated concave portions which can be folded together like the two halves of a razor shell, these halves having raised ribs or weals 35 formed on them which engage the inner surfaces of the flanks of the aerofoil portion of the blade. In the platform zone 26 the baffle is of parallel-sided channel section, one or both sides 36 being welded to the inner surface of the sides of the platform zone. The transverse wall 37 of the channel section portion of the baffle terminates adjacent the rear edge of the aperture 28 in the insertion 22 so that cooling medium introduced through the opening 32 in the rear of the blade will pass upwardly through the aperture 28 and be guided by the wall 37 and by the portion of the baffle 33 in front of the weals 35 up the interior of the blade adjacent the leading edge 38.

Provision is made for the escape of the cooling medium down the trailing edge 39 of the blade, by inserting thin spacers 40 in the manner described in the aforementioned United States of America application No. 378,935. Alternatively the two flanks of the blade adjacent the trailing edge may be nipped and welded together at intervals. These expedients provide a row of apertures 41 down the trailing edge of the blade through which the cooling medium can escape.

The insertion 22 is brazed or welded in position, after which a final machining operation completes the "fir tree" root.

To complete the blade, a sealing projection 42 is welded on to the front portion 18 of the platform zone.

Figure 9:
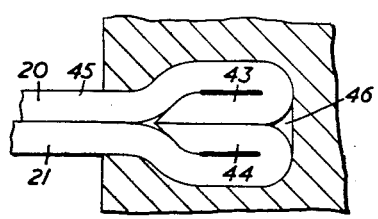
Figures 9 and 10 are fragmentary sectional views showing modified forms of root portion.

Modified forms of blade fixing can be provided instead of the "fir-tree" root if required. For instance, if the root form required is of the "half bulb" type this root can be formed as shown in Figure 9. In this case the ends 43 and 44 of the projecting tongues 20 and 21 respectively are bent back on themselves as shown, to shorten the tongues and to double their thickness. The single thickness parts of the tongues are then pressed together to form the neck 45 of the half bulb. The half bulb thus formed is inserted into a corresponding undercut groove 46 in the turbine motor.

Figure 10:
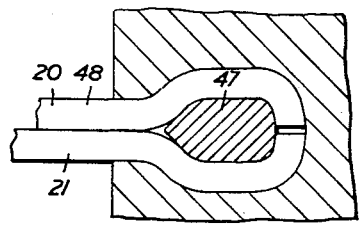

Another way of forming a "half bulb" root is shown in Figure 10. In this case the extremities of the root tongues 20 and 21 are wrapped around a bar 47, the parts of the tongues adjacent the bar being pressed together to form a neck 48.

If other root shapes are required these can be produced by other suitable manipulations of the tongues 20 and 21.

What I claim as my invention and desire to secure by Letters Patent is:

1. The method of making a hollow turbine blade which comprises the steps of pressing a blank of sheet metal to corrugate a part of said blank with a ridge and a depression adjoining along a transition line and to form a further part of said blank as a trough having a base and two sides with a flap extending from one edge of one of said sides, said edge being aligned with said transition line, folding said pressed blank along said edge and said transition line to close said flap over said trough to make a boxlike portion to constitute a platform zone and a root zone of said blade and to bring said ridge into said depression to constitute respectively concave and convex flanks of a hollow airfoil zone of said blade, joining adjacent edges of said flap and said trough to constitute a corner of said boxlike portion, removing portions from the two opposite sides of said box-like portion constituted by the two sides of the said trough to leave a projecting tongue constituted by an end portion of said flap and a parallel projecting tongue constituted by an end portion of said base of said trough, shortening and thickening said tongues, and further manipulating said thickened tongues to form said blade root.

2. A method of making a hollow turbine blade according to claim 1 in which said shortening and thickening of said tongues is effected by an upsetting operation.

3. A method of making a hollow turbine blade according to claim 1 in which said shortening and thickening of said tongues is effected by doubling back the extremities of said tongues.

4. A method of making a hollow turbine blade according to claim 1 in which said further manipulation of said thickened tongues comprises bending said tongues towards each other and forming parallel corrugations therein.

5. A method of making a hollow turbine blade according to claim 1 in which said further manipulation of said thickened tongues comprises pressing said thickened tongues together to form a bulb-like blade root spaced from said platform zone by a neck narrower than said root.

6. A method of making a hollow turbine blade according to claim 1 which comprises introducing a strengthening insertion between said tongues prior to said further manipulation of said tongues.

7. A method of making a hollow turbine blade according to claim 1, which comprises introducing a longitudinal baffle into the hollow interior of said aerofoil zone prior to said further manipulation of said tongues.

References Cited in the file of this patent

UNITED STATES PATENTS

| | | |
|---|---|---|
| 1,980,834 | Squires | Nov. 13, 1934 |
| 2,378,059 | Brauchler | June 12, 1945 |
| 2,559,013 | Eastman et al. | July 3, 1951 |
| 2,559,131 | Oestrich et al. | July 3, 1951 |
| 2,675,208 | Weinberg | Apr. 13, 1954 |
| 2,699,598 | Daugherty | Jan. 18, 1955 |
| 2,762,114 | Steinhauer | Sept. 11, 1956 |
| 2,772,855 | Stalker | Dec. 4, 1956 |
| 2,799,919 | Wilder | July 23, 1957 |

FOREIGN PATENTS

| | | |
|---|---|---|
| 359,349 | Great Britain | Oct. 22, 1931 |
| 926,397 | Germany | Apr. 18, 1955 |